United States Patent
Venable

(10) Patent No.: US 12,200,134 B2
(45) Date of Patent: Jan. 14, 2025

(54) MULTIFACTOR AUTHENTICATION THROUGH CRYPTOGRAPHY-ENABLED SMART CARDS

(71) Applicant: Brex Inc., Draper, UT (US)

(72) Inventor: Jeff Venable, Union City, CA (US)

(73) Assignee: Brex Inc., Draper, UT (US)

( * ) Notice: Subject to any disclaimer, the term of this patent is extended or adjusted under 35 U.S.C. 154(b) by 224 days.

(21) Appl. No.: 17/562,952

(22) Filed: Dec. 27, 2021

(65) Prior Publication Data

US 2022/0353084 A1   Nov. 3, 2022

Related U.S. Application Data

(60) Provisional application No. 63/183,496, filed on May 3, 2021.

(51) Int. Cl.
| | | |
|---|---|---|
| H04L 29/00 | (2006.01) | |
| G06K 7/10 | (2006.01) | |
| G06Q 20/34 | (2012.01) | |
| H04L 9/32 | (2006.01) | |
| H04W 12/06 | (2021.01) | |

(52) U.S. Cl.
CPC ........ *H04L 9/3234* (2013.01); *G06K 7/10366* (2013.01); *G06Q 20/341* (2013.01); *G06Q 20/352* (2013.01); *H04L 9/3247* (2013.01); *H04L 9/3271* (2013.01); *H04W 12/06* (2013.01); *H04L 2209/56* (2013.01)

(58) Field of Classification Search
CPC ... H04L 9/3234; H04L 9/3247; H04L 9/3271; H04L 2209/56; G06K 7/10366; G06Q 20/341; G06Q 20/352; H04W 12/06

USPC ........................................................ 713/172
See application file for complete search history.

(56) References Cited

U.S. PATENT DOCUMENTS

| | | | |
|---|---|---|---|
| 2013/0226812 A1* | 8/2013 | Landrok .......... | G06Q 20/40145 705/67 |
| 2014/0273857 A1* | 9/2014 | White .............. | H04W 4/029 455/41.2 |
| 2019/0228178 A1 | 7/2019 | Sharma et al. | |
| 2019/0392424 A1 | 12/2019 | Wilson et al. | |
| 2020/0090168 A1* | 3/2020 | Mossler .......... | G06Q 20/352 |

* cited by examiner

*Primary Examiner* — Jeffrey C Pwu
*Assistant Examiner* — Michael D Anderson
(74) *Attorney, Agent, or Firm* — PERKINS COIE LLP

(57) ABSTRACT

There are provided systems and methods for multifactor authentication through cryptography-enabled smart cards. A user may engage in transactions or other online interactions that may require multifactor authentication, such as by providing a secondary or further piece of evidence or information that is used to more securely trust the user and that they are not another malicious user. The user may utilize a physical card that includes a microchip embedded to a surface, where the microchip includes a key or other cryptographic signing function to be able to be scanned and digitally sign a request for authentication from a computing device. A user's computing device may then be brought into close proximity to the microchip when a request to scan the card's microchip is received. The user's computing device may then use wireless signals to activate the microchip and perform a multifactor authentication.

20 Claims, 4 Drawing Sheets

MULTIFACTOR AUTHENTICATION THROUGH CRYPTOGRAPHY-ENABLED SMART CARDS

CROSS-REFERENCE TO RELATED APPLICATIONS

This application claims priority to and the benefit of U.S. Provisional Patent Application No. 63/183,496, filed on May 3, 2021, the contents of which are hereby incorporated by reference in their entirety.

TECHNICAL FIELD

The present application generally relates to physical payment cards having embedded microchips, and more particularly to performing multifactor authentication using cryptography-enabled smart cards.

BACKGROUND

Users may utilize online transaction processors for processing payments between different entities through device applications and digital accounts. Further, these online transaction processors or other service providers may provide physical payment cards for in-person transaction processing at merchant locations. When conducting online transactions over a network, or other transactions where the user and/or card may not be present, the online transaction processors may utilize additional authentication steps for enhanced security. Multifactor authentication may be utilized by using additional secrets, evidence, or information that should be known only to the user. For example, a message may be sent to the user's computing device or mobile phone that includes a secret or code that the user enters during an authentication attempt and/or online transaction processing. This provides further trust in the transaction and attempts to minimize risk. However, malicious actors may further use computing devices and/or accounts, and thieves may steal devices. Additionally, these processes cause additional friction and time that reduce users' experience with the multifactor authentication process. Thus, online transaction processors may wish to provide faster and more seamless multifactor authentication processes through more secure multifactor authentication processes.

Therefore, there is a need to address deficiencies with conventional systems used for secure authentication through multifactor authentication evidence.

Figure 1:
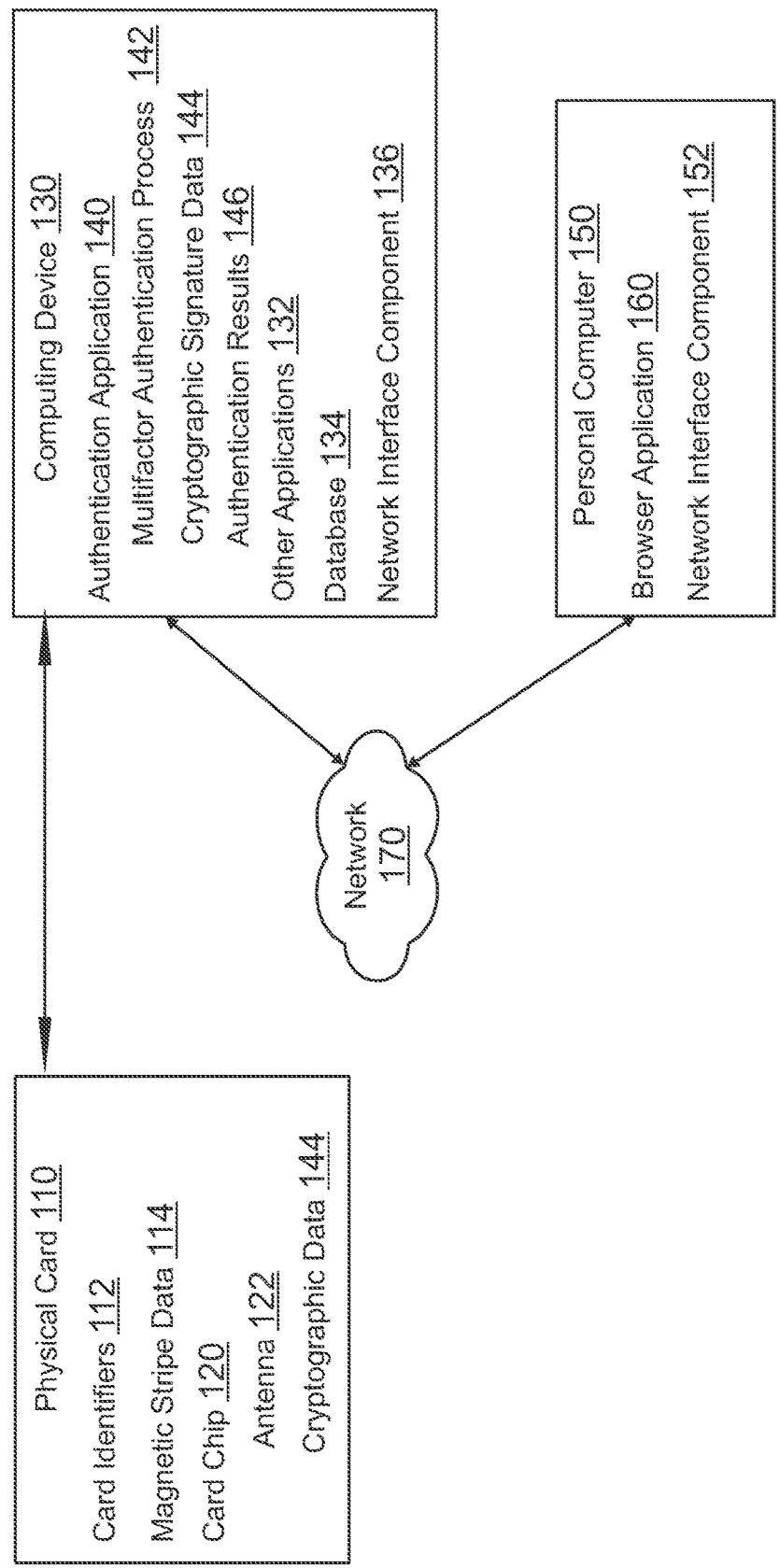
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for multifactor authentication through cryptography-enabled smart cards. Systems suitable for practicing methods of the present disclosure are also provided.

An organization may issue one or more payment cards to customers, clients, and/or employees to process payments through an electronic card and/or transaction network associated with a backend payment processor on the network. A payment card may be linked to an account with an online transaction service provider, such as a service provider that facilitates processing of payments and enforcement of expense policies for payment instruments. In one example, such a payment processing and expense management system may be provided by BREX®, Inc. of San Francisco, CA, USA., which may provide electronic transaction processing services to customers and client organizations through credit accounts, debit cards, direct debit/credit through automated clearing house (ACH), wire transfers, gift cards, and other types of funding sources that may be issued to the organizations by the payment processing and expense management system, and well as other integrated financial service providers. Digital accounts and physical payment cards may be used for in-store or physical payment transactions, such as by scanning a payment card or capturing data representing the account via a point-of-sale (POS) device and the like. Further, accounts and cards may also be used via one or more websites and/or applications of online merchants. In order to more securely identify and authenticate users, as well as secure transaction processing, multifactor authentication may be used through a physical payment card having an embedded microchip.

For example, an employee or other user of an organization may wish to process a purchase of items or services via a digital account and/or payment card that provides values, credit, or other funds to the user. When originally establishing an account and/or being issued a payment card that may be linked to an account, the user may establish account creation details and/or personal information tied to the payment card. For example, the user may provide personal information for the user, business or merchant information for an entity, or other types of identification information including a name, address, and/or other identifier. The user may also establish authentication information, such as a name, password, PIN, and/or other secret used to authenticate the user and/or access to the account. When the payment card is created and issued, the payment card may include a microchip, such as an EMV chip, Java Smart Card chip, NFC chip and/or antenna, or the like.

When initially created, the chip is loaded or programmed with a unique cryptographic signing function, mechanism, and/or data, which allows for uniquely signing requests for authentication and the like digitally by scanning or otherwise reading the chip of the card. The chip may further be coupled to a passive antenna, which allows scanning of the chip, reading the data, and digitally signing using the cryptographic data on the chip. The user may also link the account and/or payment card to a mobile application of the system that resides on a mobile smart phone of the user, which may allow secure access to the account and/or multifactor authentication by scanning the microchip on the phone. Thus, the user may link the payment card (and its corresponding cryptographic data) and a mobile smart phone (and corresponding mobile application) to each other and/or the user's account so that multifactor authentication may be facilitated.

In order to pay for a transaction (e.g., a transfer or payment to another user, merchant, or other entity), the user may provide the payment card or may login to an account using authentication information. Payment card data may be stored to one or more storage mediums on the payment card, such as a magnetic stripe or an EMV chip, which may then be read to facilitate an in-person or card-present transaction. For example, a POS device and/or card reader may be used to read the card data from a merchant device at a merchant location. However, online transactions may also be performed using card data, such as in a card-not-present transaction. A payment may then be issued to another party to the transaction by entering transaction details that are then submitted for processing. The payment processing and expense management system may include an integration with one or more electronic card networks that allows for data exchange and communications between over payment networks. The payment processing and expense management system may receive or detect the transaction data for the electronic transaction over a network and may request multifactor authentication by reading the microchip of the physical payment card using a scanning device (e.g., a mobile smart phone that may include an RFID, NFC, etc., scanner). In response to receiving or detection the transaction data, the system may then issue a multifactor authentication request to the linked device of the user.

When issuing the multifactor request by the payment processing and expense management system, a communication may be sent to the computing device of the user that is linked to the physical payment card and/or account. The communication may correspond to a push notification for a mobile application of the system, however, other communication channels may also be used including text messaging, email, operating system (OS) based messaging, and the like. The user may be instructed to place the card in proximity to their mobile smart phone or other computing device. The request or other message may also activate a wireless communication component on the user's device, which may include capabilities to scan, read, and/or activate the microchip. This then allows the microchip to be activated so that the multifactor authentication request can be digitally signed using the cryptographic signing data stored by the card's chip. Once signed or other cryptographic key or PIN is provided back the user's device for the multifactor authentication request, the user's computing device may respond to the payment processing and expense management system to authenticate the user. This may include turning a card-not-present transaction to a card-present transaction by verifying the payment card is in possession of the user having their computing device. Additional confidence factors may be used to further validate the user is properly identified and not fraudulent, including a location, device activity, biometrics, and the like. Thus, the multifactor authentication may provide additional factors to two-factor authentication by using the payment card alone. In other embodiments, the multifactor authentication challenge may be in response to other types of authentication requests. For example, the payment card's microchip may be used with the application on the user's computing device when logging in to the user's account, requesting use of cryptocurrency, or performing other security action using the cryptographic signing data of the card's chip.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary devices and servers may include device, stand-alone, and enterprise-class servers, operating an OS such as a MICROSOFT® OS, a UNIX® OS, a LINUX® OS, or another suitable device and/or server-based OS. It can be appreciated that the devices and/or servers illustrated in FIG. 1 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a physical card 110, a computing device 130, and a personal computer 150 in communication for multifactor authentication, such as over a network 170. Physical card 110 may be used by a user to process transactions in-person or over a network, which may include a card chip 120 activatable and/or scannable by computing device 130 for multifactor authentication.

Physical card 110 may correspond to a physical payment card that may be used to store card data corresponding to financial data used to process transactions. In some embodiments, physical card 110 may correspond to a standard sized card (e.g., ~85.×54 mm (3.37×2.125 in)) card having rounded corners that may include card identifiers 112, such as a 16-digit card number or other series of digits and/or alphanumeric codes for payment processing on a card network, and other card data stored on a magnetic stripe 114 or one or more other storage mechanisms (e.g., EMV chip or the like). Physical card 110 may also correspond to a key fob or other device that similarly may include a data storage mechanism. In some embodiments, physical card 110 may be used to facilitate transactions using card identifiers 112 (e.g., a credit or debit card number, card verification value (CVV), issued user, card processor network identifier, and the like) over one or more networks, such as with digital network exchanges for card-not-present transactions. In additional embodiments, physical card 110 may be used to process transactions in-person at physical merchant locations by scanning magnetic stripe 114 or other mechanisms storing card data.

Physical card 110 includes a card chip 120 having an antenna 122 and cryptographic data 124. Card chip 120 may correspond to an EMV chip, Java Smart Card chip, NFC or RFID chip, or the like that may store cryptographic data 124 for a cryptographic signing function or mechanism to provide a digital signature and/or cryptographic key that may be used to validate the authenticity and/or integrity of a message, such as an authentication message. Cryptographic data 124 may utilize a cryptographic signing using a mathematical function, such as RSA mechanisms and signatures. Card chip 120 may be activated and/or read using antenna 122, which may correspond to a passive antenna that is activated and powered through short-range wireless communications. However, in other embodiments, card chip 120 may include a power unit and/or charge, which may be rechargeable and/or utilized for a lifetime of the power unit with antenna 122. Cryptographic data 124 may be initially coded and stored to card chip 120 at a creation of physical card 110 and/or card chip 120 or may be later encoded with data including recoding cryptographic data 124 when physical card 110 exchanges ownership. Physical card 110 and cryptographic data 124 may be linked to backend data for a user, such as a user's identification, account, and/or mobile smart device/mobile application that allows for multifactor authentication by computing device 130 signing a message using card chip 120 when accessing cryptographic data 124 using antenna 122.

Computing device 130 and/or personal computer 150 may include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100 and/or accessible over a network.

Computing device 130 may be implemented using any appropriate hardware and software configured for wired and/or wireless communication with physical card 110 and/or over a network with a device or server requesting multifactor authentication. In various embodiments, computing device 130 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Computing device 130 of FIG. 1 contains an authentication application 140, other applications 132, a database 134, and a communication component 136. Authentication application 140 and other applications 132 may correspond to executable processes, procedures, and/or applications with associated hardware. In other embodiments, computing device 130 may include additional or different software as required.

Authentication application 140 may correspond to one or more processes to execute software modules and associated components of computing device 130 to perform multifactor authentication using physical card 110, which may include processing transactions at a physical merchant location and/or over a network with an online marketplace. In this regard, authentication application 140 may correspond to specialized hardware and/or software utilized to process a received message or request for multifactor authentication when physical card 110 is used to process a transaction. In some embodiments, authentication application 140 may be used to establish the transaction. For example, at a physical merchant location, authentication application 140 may designate the items for purchase, where physical card 110 and/or computing device 130 may provide card data for physical card 110 to process the transaction. With digital or electronic transactions, authentication application 140 may designate the items for purchase through the online marketplace for the merchant and provide the card data for transaction processing. In other embodiments, the message or request for multifactor authentication may be received in response to a different event, such as an account login, use of cryptocurrency stored on physical card 110, computing device 130, or another device, or other authentication event.

In various embodiments, authentication application 140 may correspond to a general browser application configured to retrieve, present, and communicate information over the Internet (e.g., utilize resources on the World Wide Web) or a private network. For example, authentication application 140 may provide a web browser, which may send and receive information over one or more networks, including retrieving website information, presenting the website information to the user, and/or communicating information to the website, including payment information for the transaction. However, in other embodiments, authentication application 140 may include a dedicated application of a service provider, transaction processor, or another entity (e.g., a merchant), which may be configured to assist in processing transactions electronically.

When the event requiring multifactor authentication occurs, authentication application 140 may receive a message or request that requires a digital signature or cryptographic key from cryptographic data 124 in card chip 120 of physical card 110. Authentication application 140 may execute a multifactor authentication process 142 with the received message, which may then activate a short-range wireless protocol and signaling of communication component 136. Multifactor authentication process 142 may request computing device 130 and physical card 110 be brought into proximity, such as touched to a case, interface, or component of computing device 130. Multifactor authentication process 142 may then activate card chip 120 and utilize cryptographic data 124 from card chip 120 using antenna 122 and the short-range wireless signaling of communication component 136. By utilizing cryptographic data 124, card chip 120 may digitally sign the message and receive cryptographic signature data 144 for the message. Cryptographic signature data 144 may correspond to a cryptographic signature of the message and may be transmitted to the device or service of the system requesting multifactor authentication (e.g., a payment processing and expense management system). Thereafter, authentication application 140 may receive authentication results 146 that indicate whether authentication has been processed and completed, or if it has been refused.

In various embodiments, computing device 130 includes other applications 132 as may be desired in particular embodiments to provide features to computing device 130. For example, other applications 132 may include security applications for implementing client-side security features, programmatic client applications for interfacing with appropriate application programming interfaces (APIs) over a network, or other types of applications. Other applications 132 may also include email, texting, voice and IM applications that allow receipt of multifactor authentication requests. Other applications 132 may also include other location detection applications, which may be used to determine a location for computing device 130 and provide the location as additional confidence factors for multifactor authentication.

Computing device 130 may further include database 134 which may include, for example, identifiers such as operating system registry entries, cookies associated with authentication application 140 and/or other applications 132, identifiers associated with hardware of computing device 130, or other appropriate identifiers. Database 134 may also further store received transaction data for processed transactions, as well as data used for multifactor authentication, such as a multifactor authentication request or message and cryptographic signature data 144.

Computing device 130 includes at least one communication component 136 adapted to communicate with physical card 110 and/or over a network. In various embodiments, communication component 136 may include a DSL (e.g., Digital Subscriber Line) modem, a PSTN (Public Switched Telephone Network) modem, an Ethernet device, a broadband device, a satellite device and/or various other types of wired and/or wireless network communication devices. Short-range communication by communication component 136 may be facilitated using a microwave, radio frequency, infrared, Bluetooth, near field communication devices, and the like.

Personal computer 150 may be implemented using any appropriate hardware and software configured for wired and/or wireless communication with physical card 110 and/or personal computer 150 over a network 170 during a multifactor authentication. In various embodiments, personal computer 150 may be implemented as a personal computer (PC), a smart phone, laptop/tablet computer, wristwatch with appropriate computer hardware resources, other type of wearable computing device, and/or other types of computing devices capable of transmitting and/or receiving data. Although only one computing device is shown, a plurality of computing device may function similarly.

Personal computer 150 of FIG. 1 contains browser application 160 and a network interface component 152. Browser application 160 may correspond to executable processes, procedures, and/or applications with associated hardware. In other embodiments, personal computer 150 may include additional or different software as required.

Browser application 160 may correspond to one or more processes to execute software modules and associated components of personal computer 150 to perform multifactor authentication using physical card 110, which may include processing transactions at a physical merchant location and/or over a network with an online marketplace. In this regard, browser application 160 may correspond to specialized hardware and/or software that may be used to log in to a device associated with a service provider for physical card 110. For example, browser application 160 may be used to log in to a dashboard associated with a service provider. Computing device 130 may present, through an additional wireless medium (e.g. Bluetooth antenna of the like), which may be distinct from an NFC or RFID antenna, as a WebAuthN (webauthn.io) authenticator (e.g. Yubikey), that it has a cryptographic 'enclave' associated with card chip 120.

Thereafter, when a user logs in to a service provider's website or application, such as through browser application 160 to the service provider associated with physical card 110, the service provider may receive the user's login name or other identifier. The service provider may pull from a backend database to identify the user and card chip 120 associated with that user (e.g., from their login name or other identifier). Browser application 160 may initiate an authentication protocol, such as the WebAuthN protocol, for authentication during the login attempt. Browser application 160 may view that the available WebAuthN authenticator or other authentication protocol is available, such as if computing device 130 is available or presenting over Bluetooth. Browser application 160 may then initiates WebAuthN protocol or other authentication protocol and prompt a user to enter a PIN via computing device 130. This may then unlock card chip 120 when physical card 110 is in proximity to computing device 130. Unlocking card chip 120 may enable signing operations, which then returning the signed result back over computing device 130 to browser application 160. Browser application 160 then may complete the authentication and the user may then login, such as without a password or foregoing additional authentication. This may occur over short range communications or over network 170.

Thus, a mobile application, such as authentication application 140, may serve as the engagement between physical card 110 and personal computer 150, for example, via NFC and/or Bluetooth communications. When the required protocol is initiated (e.g., CTAP2 for WebAuthN), authentication application 140 may request enter of a PIN, biometric, or other authentication information to computing device 130. Further, authentication application 140 may request scanning, entry, or other reading of physical card 110, such as by reading card chip 120. Further entry of additional authentication information, such as a PIN, may validate that physical card 110 and computing device 130 are in proximity and therefore can digitally sign information.

Personal computer 150 includes at least one network interface component 152 adapted to communicate with physical card 110 and/or computing device 130 over a network 170. In various embodiments, network interface component 152 may include a DSL (e.g., Digital Subscriber Line) modem, a PSTN (Public Switched Telephone Network) modem, an Ethernet device, a broadband device, a satellite device and/or various other types of wired and/or wireless network communication devices. Short-range communication by network interface component 152 may be facilitated using a microwave, radio frequency, infrared, Bluetooth, near field communication devices, and the like.

System 100 may further include a network 170, which may be implemented as a single network or a combination of multiple networks. Network 170 may be used by computing device 130 for communication with a backend server of a payment processing and/or expense management system for multifactor authentication. For example, in various embodiments, network 170 may include the Internet or one or more intranets, landline networks, wireless networks, and/or other appropriate types of networks. Thus, network 170 may correspond to small scale communication networks, such as a private or local area network, or a larger scale network, such as a wide area network or the Internet, accessible by the various components of system 100.

Figure 2:
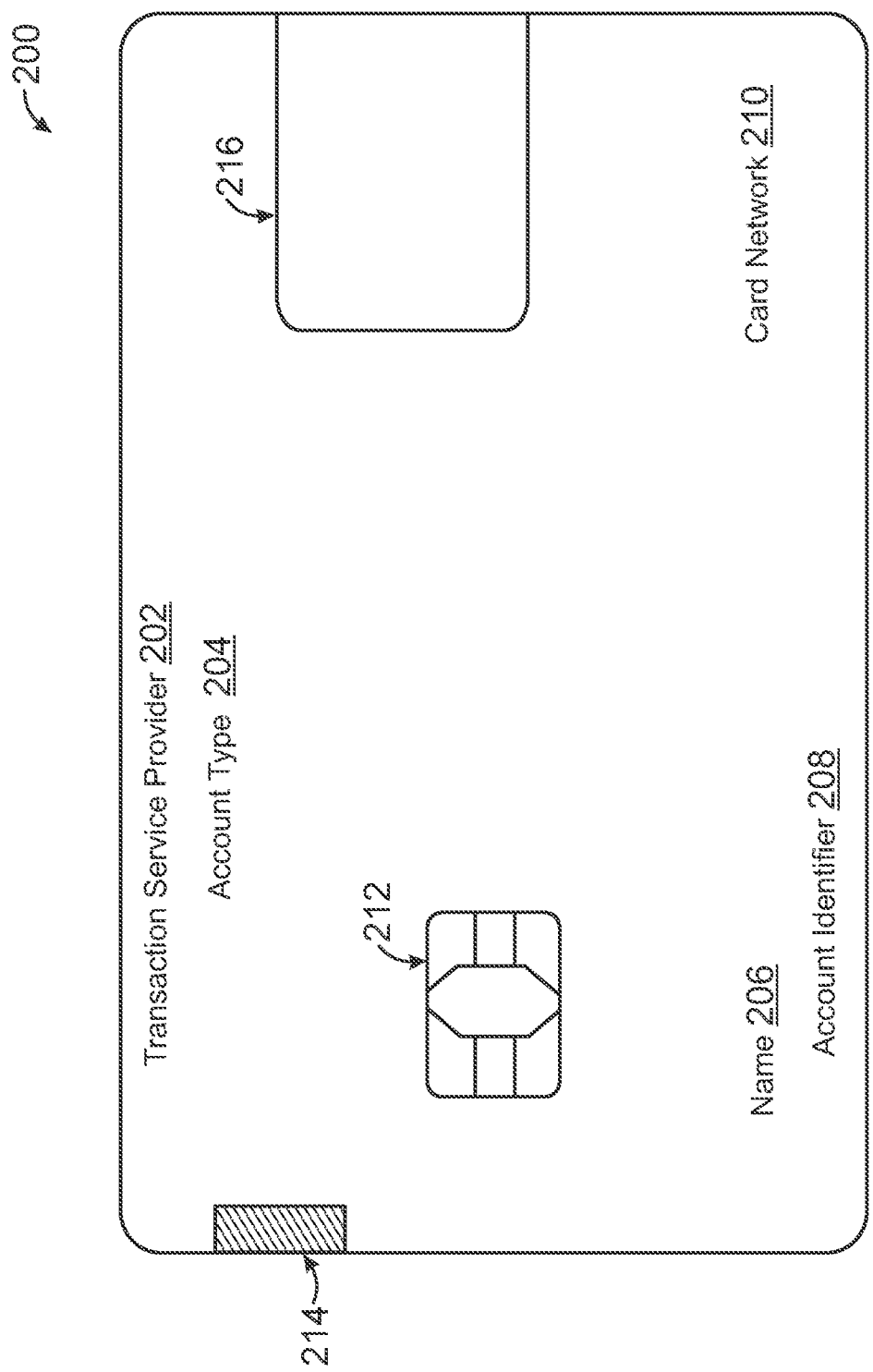
FIG. 2 is an exemplary physical payment card having an embedded microchip for cryptographically signing multifactor authentication requests, according to an embodiment.

FIG. 2 is an exemplary physical payment card 200 having an embedded microchip for cryptographically signing multifactor authentication requests, according to an embodiment. Physical payment card 200 of FIG. 2 includes identifiers, data, and components for interacting with computing device 130, discussed in reference to system 100 of FIG. 1, for multifactor authentication.

In this regard, physical payment card 200 includes identifiers on one or more surfaces of the card, as well as microchips and/or storage devices for storing encoded data and/or cryptographically signing requests for multifactor authentication. For example, identifier written, designed on, and/or embossed into a card surface may include a transaction service provider 202, an account type 204, a name 206, an account identifier 208, and/or a card network 210. Each of these identifiers may be utilized when establishing the card and/or utilizing the card including for card-not-present transactions. For example, at least name 206 and/or account identifier 208 may be required to be entered on a checkout webpage when processing a transaction. In some embodiments, a CVV value may also be placed on a reverse side of physical payment card 200, which also may be required, as well as other data not placed on physical payment card 200 (e.g., a billing address or the like). Further, when performing card-present transactions, such as at a merchant location, an EMV chip and/or magnetic strip 214 may be read by a card reader and/or scanner, such as one incorporated in or linked to a POS device. This may allow for fast and more secure transfer of card data, which may include data for a payment processing gateway selection.

When performing a transaction or another authentication linked with physical payment card 200, a multifactor authentication may be required. Thus, a smart card chip 216 may further be embedded or enclosed within physical payment card 200. Smart card chip 216 may correspond to a Java Card chip or the like that may utilize an integrated circuit with a contact or contactless smart card design to communicate with card readers, mobile smart phones, and the like. Smart card chip 216 may include contact points to provide electrical connectivity to the integrated circuit or may utilize a passive antenna and design (e.g., a loop antenna coil) to capture a wireless signal. This may allow smart card chip 216 to be powered and thereafter execute instructions programmed and/or encoded to smart card chip 216. These instructions, when executed, may perform processes to digitally sign messages from another device, such as a mobile smart phone, using a cryptographic function or message.

In some embodiments, physical payment card 200 may further be usable and/or connectable to a physical and/or protective case of a computing device, such as a protective phone cover or case or a mobile smart phone. The protective case may include a slot for physical payment card 200 so that short-range wireless communication components of the computing device (e.g., the mobile smart phone) may activate and/or interact with smart card chip 216 for multifactor authentication. In other embodiments, the protective case may include and/or provide wired and/or wireless communication components to activate and/or interact with smart card chip 216 using an embedded antenna and circuitry components in order to provide multifactor authentication processes.

Figure 3:
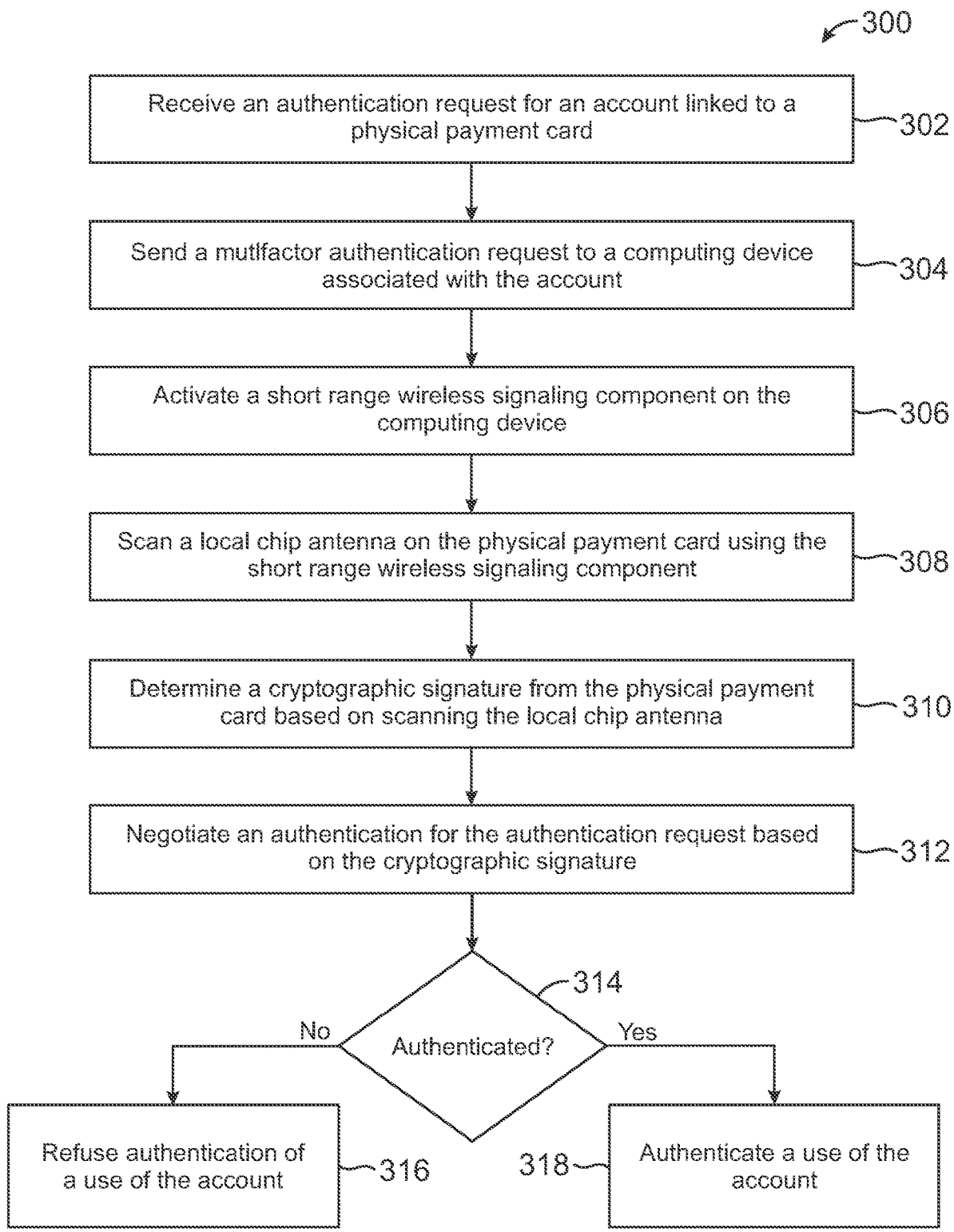
FIG. 3 is a flowchart for multifactor authentication through cryptography-enabled smart card chips, according to an embodiment.

FIG. 3 is a flowchart 300 for multifactor authentication through cryptography-enabled smart cards, according to an embodiment. Note that one or more steps, processes, and methods described herein of flowchart 300 may be omitted, performed in a different sequence, or combined as desired or appropriate.

At step 302 of flowchart 300, an authentication request for an account linked to a physical payment card is received. This authentication request may be received for a use of the physical payment card and/or funds linked the physical payment card, or for access and/or use of the account. Once received, a multifactor authentication request is sent to a computing device associated with the account, at step 304. The multifactor authentication request may ask the user to provide that the user is in possession of the physical payment card by bringing the physical payment card into proximity of the computing device that is trusted, such as a known mobile smart phone registered and/or linked to the card and/or account.

At step 306, a short-range wireless signaling component on the computing device is activated. The multifactor authentication request may include a message, code, or an operation to alert a user of the computing device to scan or read the physical payment card using a short-range communication component of the computing device. The request itself may activate the short-range wireless signaling component or the user may be requested to activate a component for scanning. At step 308, a local chip antenna on the physical payment card is then scanned using the short-range wireless signaling component. Scanning of the chip's antenna may include activating the antenna using power transferred through the wireless signaling, such as by activating a passive antenna that allows the chip to exchange data with the computing device.

At step 310, a cryptographic signature from the physical payment cared is determined by scanning the local chip antenna. This may include reading cryptographic data from the chip and/or requesting that the chip digitally sign the multifactor authentication request. The cryptographic signature may be generated and/or provided using a cryptographic signing algorithm or function that is particular to the card and provided on the card during creation of the card and/or chip. At step 312, an authentication is negotiated for the authentication request based on the cryptographic signature. This may include verifying that the cryptographic signature properly authenticates that the card and computing device are in proximity and correspond to the account and/or user. Thus, an authentication decision is determined at step 314. If refused, at step 316, flowchart 300 refuses authentication of a use of the account, which may provide increased security to transaction utilizing the card and/or account. However, if authentication is successful, at step 318, a use of the account is authenticated through a multifactor authentication, thereby further securing the use of the account.

Figure 4:
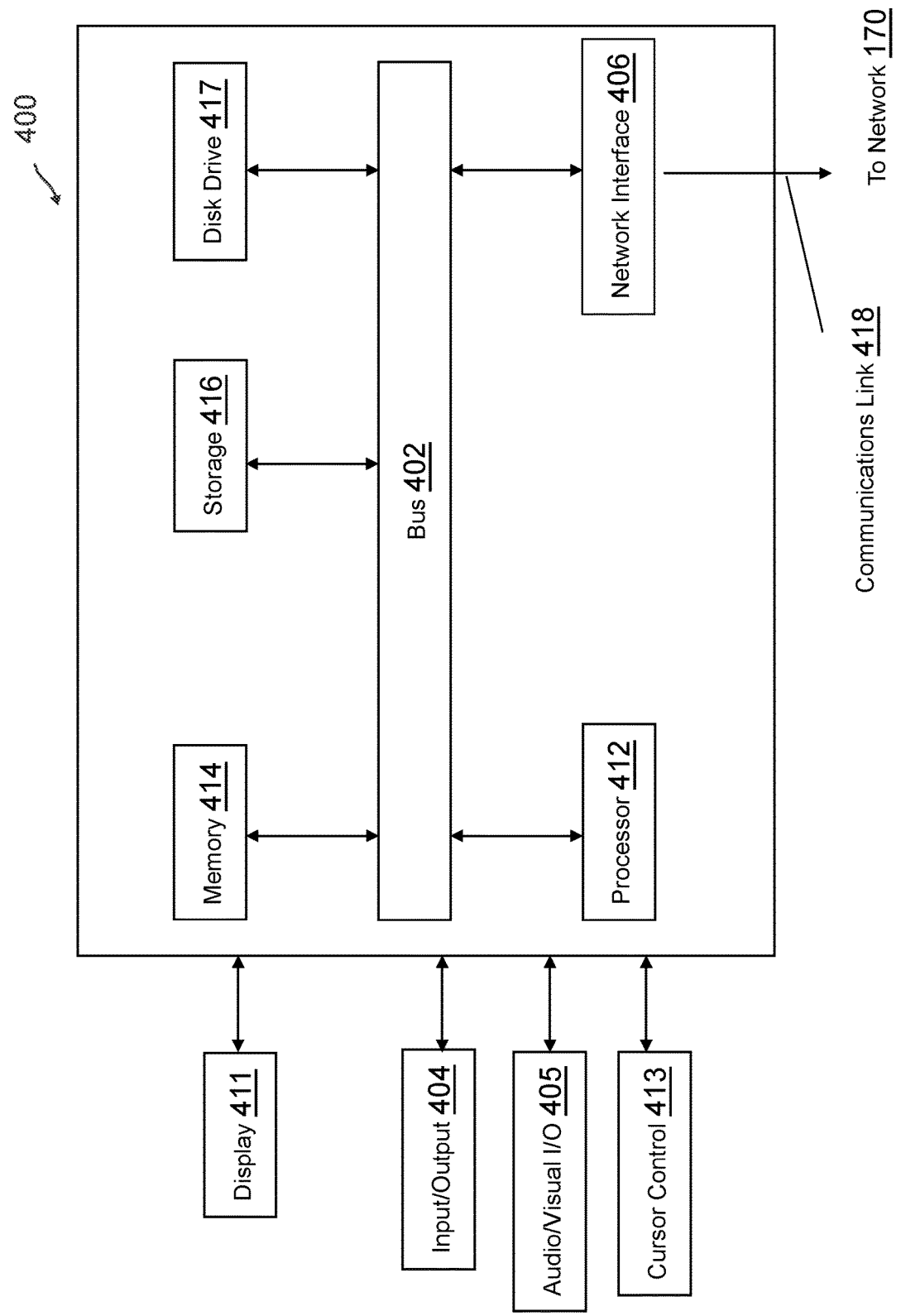
FIG. 4 is a block diagram of a computer system suitable for implementing one or more components in FIG. 1, according to an embodiment.

FIG. 4 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another communication device, service device, or a service provider server via network 170. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device system comprising:
    a short-range wireless signaling component configured for wireless communication within a proximity range via a wireless signaling protocol;
    a non-transitory memory; and
    one or more hardware processors coupled to the non-transitory memory and configured to read instructions from the non-transitory memory to cause the mobile device system to perform operations comprising:
        receiving, from a service provider server, a multifactor authentication challenge during an authentication attempt associated with a physical payment card, wherein the physical payment card comprises a microchip having cryptographic signing data;
        activating the short-range wireless signaling component to enable wireless communication with devices within the proximity range;
        receiving, from a second mobile device system via the short-range wireless signaling component, a request corresponding to an authentication protocol that authenticates a user on the mobile device system;
        prompting, based on the request received from the second mobile device system, the user to enter an authentication credential associated with the physical payment card on the mobile device system;
        unlocking, based on the authentication credential and the authentication protocol, signing operations for the microchip of the physical payment card;
        requesting, via the short-range wireless signaling component based on the unlocking, that the microchip digitally sign the multifactor authentication challenge using the cryptographic signing data;
        receiving, from the microchip, a digitally signed multifactor authentication challenge based on the multifactor authentication challenge and the cryptographic signing data; and
        processing the digitally signed multifactor authentication challenge from the service provider server during the authentication attempt.

2. The mobile device system of claim 1, wherein prior to receiving the multifactor authentication challenge, the operations further comprise:
    linking the physical payment card to at least one of a device identifier for the mobile device system, an identifier for the user associated with the mobile device system, or an account of the user.

3. The mobile device system of claim 1, wherein the microchip comprises a Java Card chip that utilizes a Java-based application with the cryptographic signing data.

4. The mobile device system of claim 1, wherein the authentication attempt is associated with a card-not-present transaction over a network with an online merchant or an online service provider, and wherein the digitally signed multifactor authentication challenge converts the card-not-present transaction to a card-present transaction.

5. The mobile device system of claim 1, wherein the authentication attempt is associated with a use of the physical payment card at a physical merchant location for a card-present transaction, and wherein the multifactor authentication challenge comprises a step-up authentication for the use of the physical payment card for the card-present transaction.

6. The mobile device system of claim 1, wherein the one of the mobile device system or the microchip further stores an amount of a cryptocurrency, and wherein the authentication attempt is for a use of the amount of the cryptocurrency for a transaction that requires the multifactor authentication challenge for the use.

7. The mobile device system of claim 1, wherein the multifactor authentication challenge is received via an electronic communication channel comprising one of a push notification for a mobile application on the mobile device system, a text message, an email, or an operating system level message.

8. The mobile device system of claim 1, wherein the cryptographic signing data is specific to the microchip based on a time of creating the microchip with encoded data for the cryptographic signing data.

9. The mobile device system of claim 1, wherein processing the digitally signed multifactor authentication challenge further comprises providing at least one additional confidence factor for the multifactor authentication challenge that comprises one of a location, a current time of the mobile device system, a network identifier, a connected device, an image, or a biometric.

10. A method performed by a mobile device, the method comprising:
receiving, from a service provider server, a multifactor authentication challenge during an authentication attempt associated with a physical payment card, wherein the physical payment card comprises a microchip having cryptographic signing data;
activating a short-range wireless signaling component to enable wireless communication within a proximity range of the mobile device;
receiving, from a second mobile device via the short-range wireless signaling component, a request corresponding to an authentication protocol that authenticates a user on the mobile device;
prompting, based on the request received from the second mobile device, the user to enter an authentication credential associated with the physical payment card on the mobile device;
unlocking, based on the authentication credential and the authentication protocol, signing operations for the microchip of the physical payment card;
requesting, via the short-range wireless signaling component based on the unlocking, that the microchip digitally sign the multifactor authentication challenge using the cryptographic signing data;
receiving, from the microchip, a digitally signed multifactor authentication challenge based on the multifactor authentication challenge and the cryptographic signing data; and
processing the digitally signed multifactor authentication challenge from the service provider server during the authentication attempt.

11. The method of claim 10, wherein prior to receiving the multifactor authentication challenge, the method further comprises:
linking the physical payment card to at least one of a device identifier for the mobile device, an identifier for the user associated with the mobile device, or an account of the user.

12. The method of claim 10, wherein the microchip comprises a Java Card chip that utilizes a Java-based application with the cryptographic signing data.

13. The method of claim 10, wherein the authentication attempt is associated with a card-not-present transaction over a network with an online merchant or an online service provider, and wherein the digitally signed multifactor authentication challenge converts the card-not-present transaction to a card-present transaction.

14. The method of claim 10, wherein the authentication attempt is associated with a use of the physical payment card at a physical merchant location for a card-present transaction, and wherein the multifactor authentication challenge comprises a step-up authentication for the use of the physical payment card for the card-present transaction.

15. The method of claim 10, wherein the one of the mobile device or the microchip further stores an amount of a cryptocurrency, and wherein the authentication attempt is for a use of the amount of the cryptocurrency for a transaction that requires the multifactor authentication challenge for the use.

16. The method of claim 10, wherein the multifactor authentication challenge is received via an electronic communication channel comprising one of a push notification for a mobile application on the mobile device, a text message, an email, or an operating system level message.

17. The method of claim 10, wherein the cryptographic signing data is specific to the microchip based on a time of creating the microchip with encoded data for the cryptographic signing data.

18. The method of claim 10, wherein processing the digitally signed multifactor authentication challenge further comprises providing at least one additional confidence factor for the multifactor authentication challenge that comprises one of a location, a current time of the mobile device, a network identifier, a connected device, an image, or a biometric.

19. A service provider system comprising:
a non-transitory memory; and
one or more hardware processors coupled to the non-transitory memory and configured to read instructions from the non-transitory memory to cause the service provider system to perform operations comprising:
receiving an authentication request associated with a physical payment card;
issuing, based on the authentication request, an authentication challenge to a device associated with the physical payment card, wherein the authentication challenge comprises executable code that causes the device and the physical payment card to generate a cryptographic signature using a cryptographic function stored on a microchip of the physical payment card;
transmitting, via a computing device to the device associated with the physical payment card, a request corresponding to an authentication protocol that authenticates a user on the device, wherein receipt of the request causes the device to activate a signaling component that enables short-range wireless signaling with devices within a proximity range of the device;
prompting the user to enter an authentication credential associated with the physical payment card on the device via the computing device using the short-range wireless signaling, wherein the prompting is performed based on the request and the authentication protocol, and wherein an entry of the authentication credential on the device causes signing operations for the microchip of the physical payment card to be unlocked using the authentication protocol;
receiving, from the device, a response to the authentication challenge; and
determining whether the response comprises the cryptographic signature to the authentication request that is associated with the cryptographic function; and
performing a multifactor authentication of the authentication request based on whether the response comprises the cryptographic signature.

20. The service provider system of claim 19, wherein the executable code further comprises a request that the physical payment card be brought within the proximity range associated with the short-range wireless signaling of the device, and wherein the cryptographic function performs the cryptographic signature responsive to detecting the short-range wireless signaling of the device within the proximity range.

* * * * *